United States Patent [19]
Honkasalo et al.

[11] Patent Number: 5,859,843
[45] Date of Patent: Jan. 12, 1999

[54] FRAMING TECHNIQUE FOR A MULTI-RATE CDMA COMMUNICATION SYSTEM

[75] Inventors: Zhi-Chun Honkasalo, Bedford, Tex.; John Noneman, Valley Center; Sona Kapadia, San Diego, both of Calif.

[73] Assignee: Nokia Mobile Phones Ltd., Salo, Finland

[21] Appl. No.: 712,309

[22] Filed: Sep. 11, 1996

[51] Int. Cl.$^6$ .................................................. H04J 13/00
[52] U.S. Cl. ...................... 370/342; 370/335; 370/441; 375/205
[58] Field of Search .................... 370/342, 335, 370/337, 345, 359, 474, 476, 477, 320, 441, 479; 375/205

[56] References Cited

U.S. PATENT DOCUMENTS

| | | | |
|---|---|---|---|
| 4,612,634 | 9/1986 | Bellamy .................................. | 370/359 |
| 5,465,269 | 11/1995 | Schaffner et al. ...................... | 370/335 |
| 5,511,073 | 4/1996 | Padovani et al. ........................ | 370/82 |
| 5,671,219 | 9/1997 | Jensen et al. ........................... | 370/345 |

FOREIGN PATENT DOCUMENTS

| | | |
|---|---|---|
| 0 642 223 A1 | 3/1995 | France . |
| 0 382 363 | 8/1990 | U.S. . |
| 0 587 225 | 3/1994 | United Kingdom . |

*Primary Examiner*—Hassan Kizou
*Assistant Examiner*—Shick Hom
*Attorney, Agent, or Firm*—Perman & Green, LLP

[57] ABSTRACT

A method and means of modifying the multi-rate high speed data CDMA system by increasing the physical layer data rate to n times the basic IS-95 rate, while not increasing the frame size proportionally to avoid the use of larger frames, and varying the data rate by changing the number of frames, N, transmitted during each period of T sec, using the relationship $R=N \times F/T$, where R bps is the physical layer data rate, F bits is the physical layer frame size, and T sec is the frame period and the interleave depth. Using this approach, the data rate can be varied between F/T bps and $N \times F/T$ bps using the same set of allowed frame sizes. Further, a major frame of data is formed using a fixed number of minor frames in combination, which minor frames are full rate and simple fractions of a full rate, i.e., ½ rate, ¼ rate, and ⅛ rate. A basic data rate is established which is the data rate that will use a single full rate frame. The sizes of the minor frames needed to generate a major frame are determined by dividing the desired data rate by the basic data rate to form a ratio, the integer portion of which ratio indicates the number of full rate frames and the fractional portion of which determines the size of the single fractional rate frame to use. The full rate frames are concatenated with the single fractional rate frame to produce the final frame structure that is transmitted.

15 Claims, 3 Drawing Sheets

FRAMING TECHNIQUE FOR A MULTI-RATE CDMA COMMUNICATION SYSTEM

BACKGROUND OF THE INVENTION

1. Field of the Invention

The present invention relates to multi-rate communication systems, such as the CDMA cellular telephone network, and more particularly to a method and means for providing a communication frame structure that can support a number of different physical layer data rates.

2. Prior Art

In existing multi-rate communication systems, such as the CDMA communication system using the IS-95 Standard, the communication messages or transmissions are transmitted using a frame structure having physical layers with different data rates. According to the IS-95 communications standard, transmissions have a physical layer frame size F, a frame period T, and a physical layer data rate R. Details of the many aspects of this technology can be found in the standards publications identified by IS-95A, TSB74, and ANSI J-STD-008, which are familiar to those of skill in the art and incorporated herein by reference.

One approach for varying the data rate is to keep the same frame size and vary the frame rate, e.g., frames may be generated every 5 ms, instead of every 20 ms as is typical, in order to increase the data rate from 9.6 kbps to 38.4 kbps. With this approach, however, the minimum air interface data rate is 4.8 kbps, rather than 1.2 kbps, which is not economical since, for instance, it wastes bandwidth. Additionally, various system timing parameters are based on the frame rate so that a change in the frame rate results in changing other system timing parameters, which changes are not desirable. Further, frames of data are interleaved over a single frame and, as it is desirable to maintain an interleave depth of 20 ms for good error correction, a frame of 5 ms, and thus an interleaving depth of 5 ms, would not provide adequate interleaving for good error correction.

Another approach is to keep the same frame rate and define different frame sizes. However, this may lead to very large frame sizes for high data rates, which results in a higher frame error rate (FER). Also, a large number of different frame types must be implemented to accomodate the various data rates in between the lowest and the highest data rate.

Thus, these two approaches to varying the data rate have limitations regarding efficiency.

Problem to be Solved:

In multi-rate communication systems, therefore, a frame structure is needed that can support a number of different physical layer data rates efficiently.

Objects of the invention:

It is an object of the present invention to provide a framing technique that overcomes the limitations in both the above-noted prior art schemes.

It is another object of the invention to provide a frame structure that can support a number of different physical layer data rates efficiently.

It is a further object of the invention to provide a framing technique that supports a large number of data rates using only a small number of different frame types.

SUMMARY OF THE INVENTION

The present invention involves the modifying of the multi-rate high speed data CDMA system to accomodate or support increasing the physical layer data rate to n times the basic IS-95 rate, while not increasing the frame size proportionally to avoid the use of very large frames which would lead to a higher FER for any given channel conditions. The data rate is varied by changing the number of frames, N, transmitted during each period of T sec, the period T being the interleave depth. With R bps being the physical layer data rate, F bits the physical layer frame size, and T sec the frame period, the following relationship holds: R=N×F/T. Using this approach, the data rate can be varied between F/T bps and N×F/T bps using a relatively small set of allowed frame sizes. This scheme also makes available a wide variety of intermediate data rates. For higher data rates, larger frame sizes may be defined to decrease the percentage of physical layer overhead since a large number of small frames leads to a higher overhead.

Further in accordance with the invention a major frame of data is formed by using a fixed number of minor frame structures in combination. The minor frames are full rate frames and simple fractions of a full rate frame, i.e., ½ rate, ¼ rate, and ⅛ rate frames. A basic data rate is established which is the data rate that will use a single full rate frame. To compute the sizes of minor frames needed to generate a major frame, the desired data rate is divided by the basic data rate to form a ratio. The integer portion of this ratio indicates the number of full rate frames needed and the fractional portion of the ratio determines the size of the fractional rate frame to use. The calculated number of full rate frames are concatenated with the single fractional rate frame to produce the final frame structure that is transmitted. For example, if the basic data rate is 9600 bps, then to format a frame of data for 24,000 bps, the ratio of 24,000/9600 equals 2.5. Accordingly, two full rate frames would be concatenated with one half rate frame to produce the desired frame format to transmit data at 24,000 bps.

DETAILED DESCRIPTION OF THE PREFERRED EMBODIMENTS

According to the specifications in the IS-95 communications standard for the CDMA communication system, transmissions have a physical layer frame size, a frame period, and a physical layer data rate. If R bps is the physical layer data rate, F bits are the physical layer frame size, and T sec is the frame period, then, in the current IS-95 CDMA system, R=F/T. A set of allowed frame sizes is specified and the data rate can be varied by choosing different frame sizes.

Figure 1:
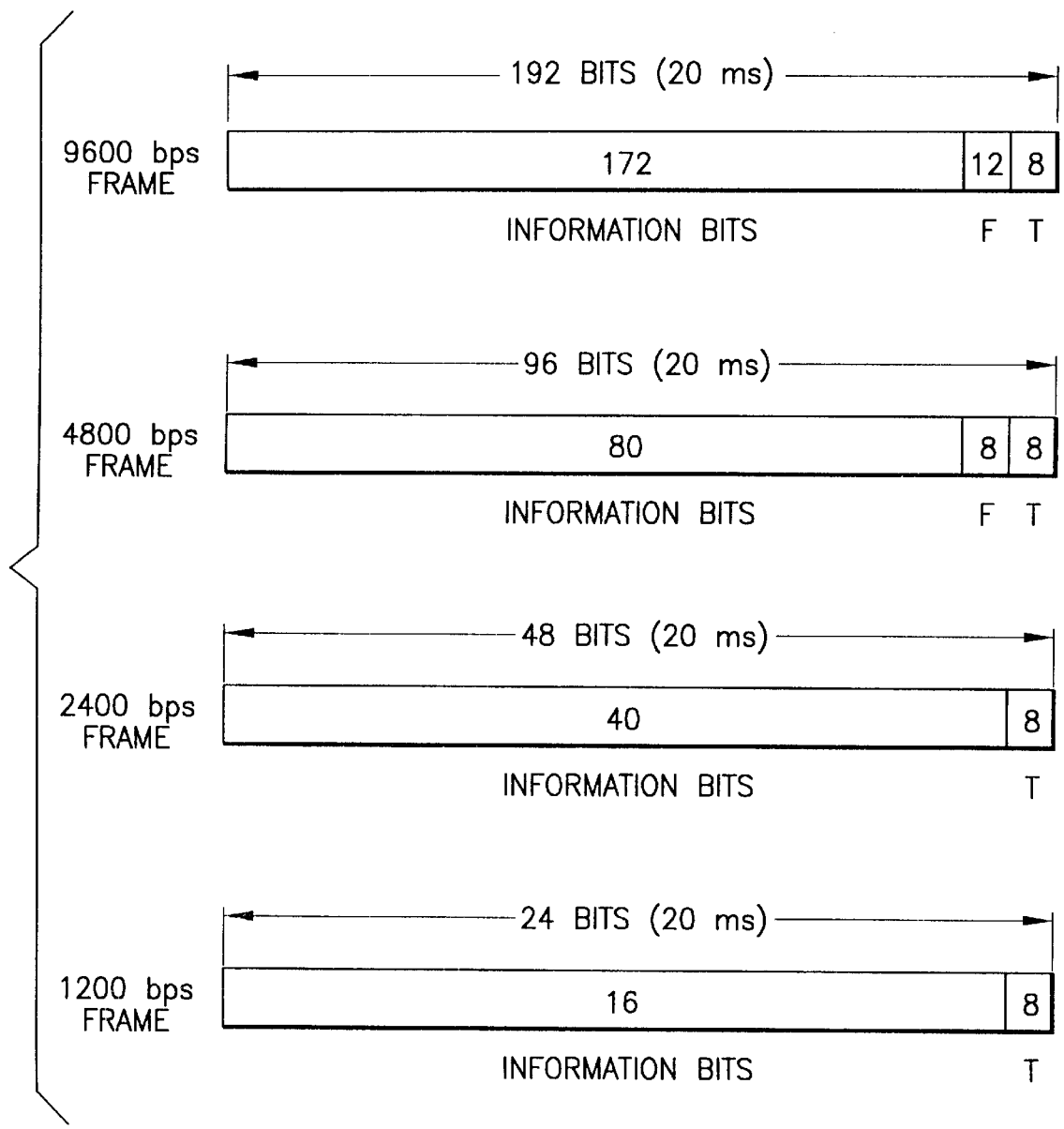
FIG. 1 illustrates the reverse traffic channel frame structures for Rate Set 1 defined by the IS-95 communications standard, i.e., full rate, ½ rate, ¼ rate, and ⅛ rate frames operating at data rates of 9600 bps, 4800 bps, 2400 bps, and 1200 bps, respectively.
Figure 2:
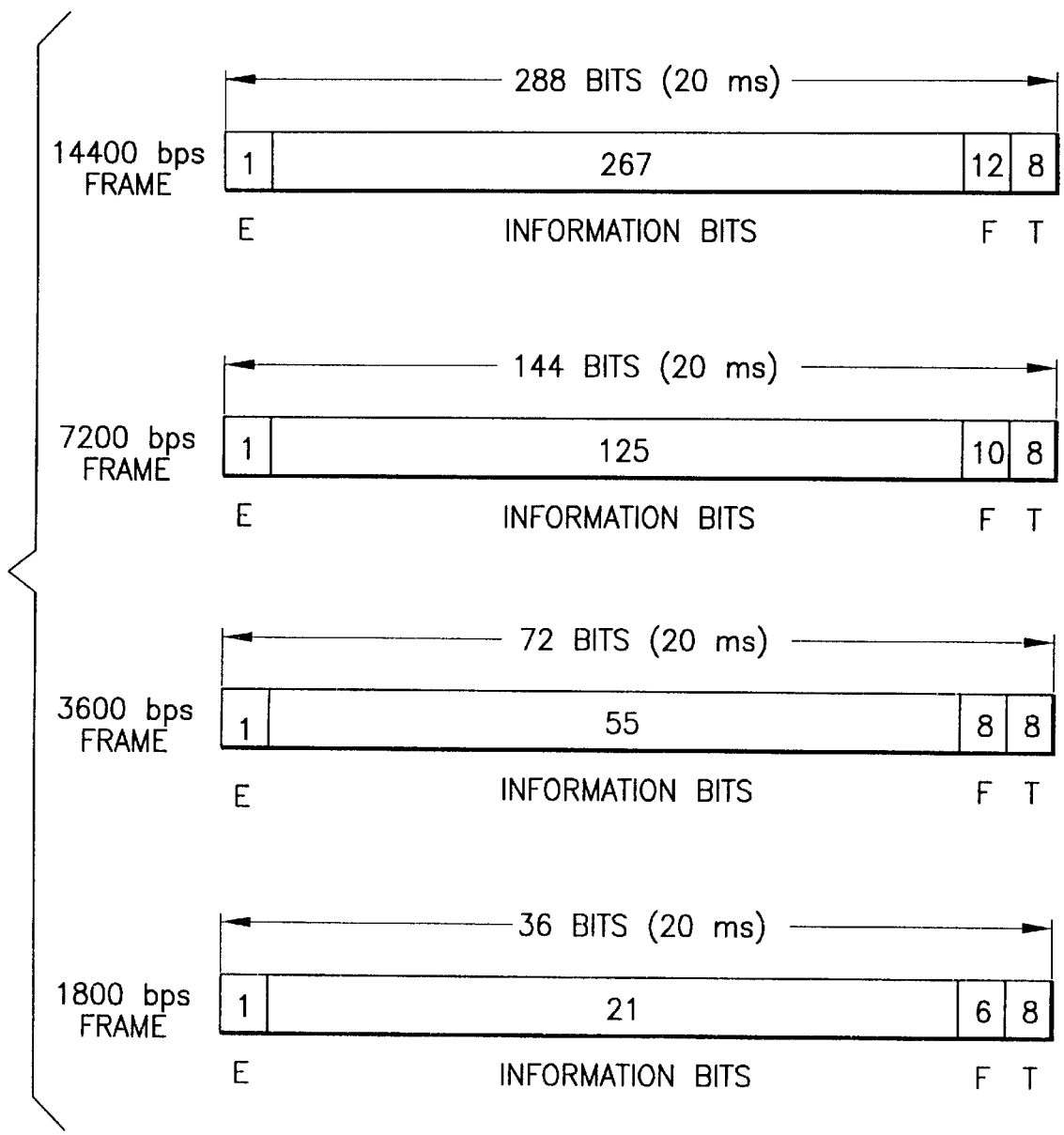
FIG. 2 illustrates the reverse traffic channel frame structures for Rate Set 2 defined by IS-95, i.e., full rate, ½ rate, ¼ rate, and ⅛ rate frames operating at data rates of 14400 bps, 7200 bps, 3600 bps, and 1800 bps, respectively.

By way of illustrating an example of an application of the present invention, firstly FIG. 1 is offered to show the frame structures for full rate, ½ rate, ¼ rate, and ⅛ rate frames operating at data rates of 9600 bps, 4800 bps, 2400 bps, and 1200 bps, respectively, for Rate Set 1 defined by the IS-95 communications standard, specifically the Reverse Channel Frame Structure for Rate Set 1 (ANSI J-STD-008). FIG. 2 shows similar frame structures at data rates of 14400 bps, 7200 bps, 3600 bps, and 1800 bps, respectively, for Rate Set 2 defined by the IS-95 communications standard. It will be seen in FIG. 1 that the 9600 bps Frame consists of 192 bits, i.e., 172 information bits, 12 CRC or frame quality indicator bits (F), and 8 encoder tail bits (T). The 4800 bps Frame consists of 96 bits, i.e., 80 information bits, 8 CRC or frame quality indicator bits (F), and 8 encoder tail bits (T). The 2400 and 1200 bps Frames have no CRC bits but their 48 and 24 bits include 40 and 16 information bits, respectively, and 8 T bits each. As seen in FIG. 2, the Rate Set 2 Frame structure includes a leading erasure indicator bit (E) along with the trailing F and T bits and the respective bit allocations are indicated in the Figure.

For the multi-rate high speed data CDMA system of the invention, the physical layer data rate is increased to n times the basic IS-95 rate, but the frame size is not increased proportionally since, as noted above, the larger frames will lead to a higher FER for any given channel conditions. Instead, the data rate is varied by changing the number of frames, N, transmitted during each period of T sec, the period T being the interleave depth. In such case, the following relationship results: R=N×F/T. Using this method, the data rate R can be varied between F/T bps and N×F/T bps using the same set of allowed frame sizes and making available a wide variety of intermediate data rates. Thus, for example, data rates of 38.4 kbps (4×9.6), 57.6 kbps, (4×14.4), 76.8 kbps (8×9.6) and 115.2 kbps (8×14.4), can be achieved using the existing frame structures defined for Multiplex Options 1 and 2, (MO1) and (MO2).

Figure 3:
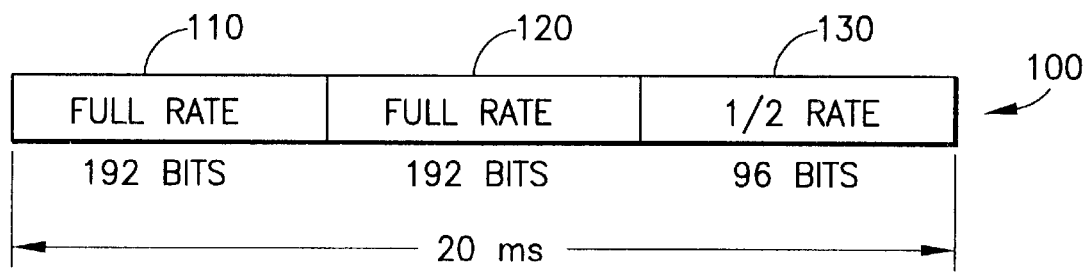
FIG. 3 illustrates an example of a major frame of data consisting of several minor frames of data, wherein the desired data rate is 24.0 kbps and the basic rate is 9600 bps so that (24/9.6=2.5) two full rate frames are concatenated with one half rate frame, in accordance with the present invention.

Further, with the invention, a major frame of data is formed by using a fixed number of minor frame structures in combination. The minor frames are full rate frames and simple fractions of a full rate frame, i.e., ½ rate, ¼ rate, and ⅛ rate frames. A basic data rate is established which is the data rate that will use a single full rate frame, e.g., 9600 bps or 14400 bps. To compute the sizes of minor frames needed to generate a major frame, the desired data rate is divided by the basic data rate to form a ratio. The integer portion of this ratio indicates the number of full rate frames needed and the fractional portion of the ratio determines the size of the fractional portion to use. The calculated number of full rate frames are concatenated with the single fractional rate frame to produce the final frame structure that is transmitted. For example, if the basic data rate is 9600 bps, to format a frame of data for 24,000 bps, the ratio of 24,000/9600 is 2.5. Accordingly, two full rate frames would be concatenated with one half rate frame to produce the desired frame format to transmit data at 24,000 bps, as shown in FIG. 3.

The following Table, TABLE I, shows examples of how to support a high speed data rate set of the invention using the existing multiplex options, based on the framing technique of this invention.

TABLE I

| | Data Rates | | Frame Types Supplied By |
|---|---|---|---|
| | Rate Set 3 | Rate Set 4 | LM to L1 |
| 1 | 1.2 kbps | 1.8 kbps | ⅛ |
| 2 | 4.8 kbps | 7.2 kbps | ½ |
| 3 | 9.6 kbps | 14.4 kbps | 1 |
| 4 | 14.4 kbps | 21.6 kbps | 1, ½ |
| 5 | 19.2 kbps | 28.8 kbps | 1, 1 |
| 6 | 24.0 kbps | 36.0 kbps | 1, 1, ½ |
| 7 | 28.8 kbps | 43.2 kbps | 1, 1, 1 |
| 8 | 33.6 kbps | 50.4 kbps | 1, 1, 1, ½ |
| 9 | 38.4 kbps | 57.6 kbps | 1, 1, 1, 1 |

Here the new Rate Set 3 (RS3) uses Multiplex Option 1 (MO1) and Rate Set 4 (RS4) uses Multiplex Option 2 (MO2). The parmameter T is 20 ms in both cases. LM is the multiplex layer and L1 is the physical Layer 1. Rate Set 3 and Rate Set 4 are rate sets added to Rate Sets 1 and 2 (RS1 and RS2) defined by the IS-95 communications standard and shown in FIGS. 1 and 2. Rate Set 3 can use the frame structures defined for Rate Set 1, and Rate Set 4 can use the frame structures defined for Rate Set 2. Consequently, no new frame structures need to be used.

For higher data rates, where the minimum data rate is higher also and low data rates, such as 1.2 kbps, are not needed, larger frame sizes may be defined to decrease the percentage of physical layer overhead. As noted, a large number of small frames leads to a higher overhead. For example, for a data rate of 307.2 kbps (32×9.6) a full rate frame size of 384 bits is chosen, since it is more efficient than a shorter frame with respect to overhead and FER. The method of this invention of concatenating full rate and fractional rate frames is then used to generate data frames at various data rates.

FIG. 3 shows an example of a major frame of data (100) consisting of several minor frames (110, 120, 130). In this example, a physical data rate of 24.0 kbps is desired and the basic data rate is 9.6 kbps. Accordingly, 24/9.6=2.5 so that two full rate frames 110 and 120 of 192 bits are concatenated with one half rate frame 130 of 96 bits in producing major frame 100.

The IS-95 air interface has a forward link from the base station to the mobile station and a reverse link from the mobile station to the base station. In applying the present invention to the forward link, it is preferred that the minor frames of data be transmitted in parallel using multiple Walsh channels. A different Walsh code is used to spread each minor frame and then the spread signals are transmitted at the same time rate over the air to the mobile station. On the other hand, in applying the invention to the reverse link, it is preferred that the minor frames of data be concatenated and transmitted serially.

It should be understood then that in order to format user data into frames of data for transmission, which data frames will support a plurality of physical layer data rates in a variable rate data network capable of transmitting frames of data, a system is employed for carrying out the following steps.

1) A physical layer data rate is determined.
2) A major frame structure is selected, from among a number of predetermined suitable major frame structures, that correlates with the selected physical layer data rate. The major frame structure comprises a predetermined group of minor frame structures, each of which has a data field of predetermined size for inserting user data. The minor frame structures may consist of ⅛ rate, ¼ rate, ½ rate, and full rate frames. The number of predetermined suitable major frame structures may constitute those indicated in TABLE I above.

3) The user data is then partitioned into minor frames.

4) The minor frames of user data are inserted into the data fields of the minor frame structures for transmission.

Also to create a frame structure for a specific data rate in the variable rate communication system with data rates which are multiples of a basic data rate and having predetermined full and fractional rate frame formats, each with a predetermined size, a system is employed to carry out the following steps.

1) A ratio is determined by dividing the specific data rate by the basic data rate.

2) A number of full rate frames equal to the integer portion of the determined ratio are concatenated.

3) A single fractional rate frame equal to the fractional portion of the determined ratio is concatenated to the concatenation of full rate frames, whereby the frame structure contains the greatest number of full rate frames.

Another example involves providing double the data rate of the previous examples by making the QPSK modulator dual channel, instead of single channel, while retaining all of the changes in those examples. In this case, for the forward channel, up to four Walsh channels are assigned to a single high speed data user, such that at least one Walsh channel operates on both in-phase and quadrature channels. The I and Q paths of the transmit path have independent data, as contrasted with the conventional IS-95 system wherein I and Q carry the same data, albeit scrambled with different long codes.

Changing the modulation to dual channel QPSK and doubling the data rate means that the lowest data rate is 2.4 kbps for Rate Set 5 and 3.6 kbps for Rate Set 6. The maximum data rates are 76.8 kbps and 115.2 kbps for Rate Set 5 and Rate Set 6, respectively. Below is a Table, TABLE II, of exemplary data rates for RS5 and RS6. The Table rates are based on Rate Set 5 and Rate Set 6 using Multiplex Options 1 and 2, taking into account different I and Q data.

Figure 4:
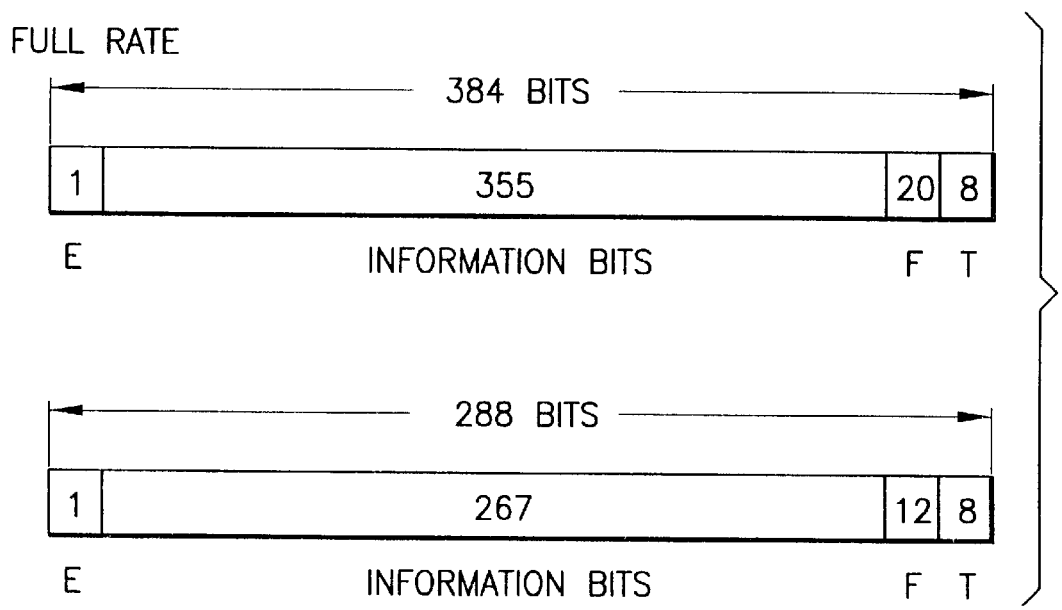
FIG. 4 illustrates an example of a frame of data according to an additional Multiplex Option (MO3) based on 384 bits which provides an efficient frame format for high speed data services.

An additional Multiplex Option (MO3) based on 384 bits may be used to provide an efficient frame format for high speed data services. The data rates at BER $10^{-3}$ or Rate Set 5 using Multiplex Option 3 are shown in TABLE III below. Note that at the higher rates a ¾ rate frame may be used which is identical to the full frame of Rate Set 2. Here the Frame format includes a longer 384 bit minor frame such as shown in FIG. 4.

TABLE II

| | Data Rates | # of Walsh channels per user | Frame Types Supplied By LM to L1 |
|---|---|---|---|
| | Rate Set 5 / Rate Set 6 | | |
| 1 | 2.4 kbps / 3.6 kbps | 1 | ⅛, ⅛ |
| 2 | 4.8 kbps / 7.2 kbps | 1 | ¼, ¼ |
| 3 | 9.6 kbps / 14.4 kbps | 1 | ½, ½ |
| 4 | 14.4 kbps / 21.6 kbps | 1 | 1, ½ |
| 5 | 19.2 kbps / 28.8 kbps | 1 | 1, 1 |
| 6 | 24.0 kbps / 36.0 kbps | 2 | 1, 1, ½ |
| 7 | 28.8 kbps / 43.2 kbps | 2 | 1, 1, 1 |
| 8 | 33.6 kbps / 50.4 kbps | 2 | 1, 1, 1, ½ |
| 9 | 38.4 kbps / 57.6 kbps | 2 | 1, 1, 1, 1 |
| 10 | 43.2 kbps / 64.8 kbps | 3 | 1, 1, 1, 1, ½ |

TABLE II-continued

| | Data Rates | # of Walsh channels per user | Frame Types Supplied By LM to L1 |
|---|---|---|---|
| | Rate Set 5 / Rate Set 6 | | |
| 11 | 48.0 kbps / 72.0 kbps | 3 | 1, 1, 1, 1, 1 |
| 12 | 52.8 kbps / 79.2 kbps | 3 | 1, 1, 1, 1, 1, ½ |
| 13 | 57.6 kbps / 86.4 kbps | 3 | i, 1, 1, 1, 1, 1 |
| 14 | 62.4 kbps / 93.6 kbps | 4 | 1, 1, 1, 1, 1, 1, ½ |
| 15 | 67.2 kbps / 100.8 kbps | 4 | 1, 1, 1, 1, 1, 1, 1 |
| 16 | 72.0 kbps / 108.0 kbps | 4 | 1, 1, 1, 1, 1, 1, 1, ½ |
| 17 | 76.8 kbps / 115.2 kbps | 4 | 1, 1, 1, 1, 1, 1, 1, 1 |

TABLE III

| User rate at BER $10^{-3}$ Rate Set 5 (kbit/s) | # of Walsh channels per user | Frame types supplied by LM to L1 |
|---|---|---|
| 2.4 | 1 | ⅛ |
| 4.8 | 1 | ¼ |
| 9.6 | 1 | ½ |
| 14.4 | 1 | ¾ |
| 19.2 | 1 | 1 |
| 24.0 | 2 | 1, ¼ |
| 28.8 | 2 | 1, ½ |
| 33.6 | 2 | 1, ¾ |
| 38.4 | 2 | 1, 1 |
| 43.2 | 3 | 1, 1, ¼ |
| 48.0 | 3 | 1, 1, ½ |
| 52.8 | 3 | 1, 1, ¾ |
| 57.6 | 3 | 1, 1, 1 |
| 62.4 | 4 | 1, 1, 1, ¼ |
| 67.4 | 4 | 1, 1, 1, ½ |
| 72.0 | 4 | 1, 1, 1, ¾ |
| 76.8 | 4 | 1, 1, 1, 1 |

It will accordingly be seen that the scheme of the present invention can thus be used to vary the data rate efficiently with a minimum of changes to an existing system specification and with an improved frame structure. Suitable communication systems for practicing the scheme of the invention may be readily assembled and implemented by those of skill in the art in the light of the foregoing descriptions.

What is claimed is:

1. A method of formatting user data into major frames of data for transmission at a plurality of physical layer data rates in a variable rate CDMA data network capable of transmitting frames of data, comprising the steps of:

determining one of said physical layer data rates;

selecting a major frame structure, that correlates with said one of said physical layer data rates, from among a number of predetermined major frame structures comprising a predetermined group of minor frame structures, each of said minor frame structures having a data field of predetermined size for inserting user data;

partitioning user data into minor frames of user data; and inserting said minor frames of user data into said data fields of said minor frame structures in the major frame structure selected in the second step.

2. The method of claim 1 wherein said predetermined major frame structures comprise minor frames selected from the group consisting of ½ rate, ¼ rate, ⅛ rate, and full rate frame sizes.

3. The method of claim 2 wherein said number of predetermined major frame structures that correlate with the physical data rates is according to the following table:

TABLE

| | Data Rates | | Frame Types Supplied By |
|---|---|---|---|
| | Rate Set 3 | Rate Set 4 | LM to L1 |
| 1 | 1.2 kbps | 1.8 kbps | 1/8 |
| 2 | 4.8 kbps | 7.2 kbps | 1/2 |
| 3 | 9.6 kbps | 14.4 kbps | 1 |
| 4 | 14.4 kbps | 21.6 kbps | 1, 1/2 |
| 5 | 19.2 kbps | 28.8 kbps | 1, 1 |
| 6 | 24.0 kbps | 36.0 kbps | 1, 1, 1/2 |
| 7 | 28.8 kbps | 43.2 kbps | 1, 1, 1 |
| 8 | 33.6 kbps | 50.4 kbps | 1, 1, 1, 1/2 |
| 9 | 38.4 kbps | 57.6 kbps | 1, 1, 1, 1 | where:

Rate Set 3 uses Multiplex Option 1 (MO1);

Rate Set 4 uses Multiplex Option 2 (MO2);

T is 20 ms in both cases;

LM is the multiplex layer;

L1 is the physical layer; and

Rate Set 3 and Rate Set 4 are rate sets added to Rate Sets 1 and 2 defined by the IS-95 communications standard.

4. The method of claim 1 wherein said number of predetermined major frame structures that correlate with the physical data rates are in accordance with the IS-95 communications standard.

5. The method of claim 1 wherein the data rate is determined by selecting the number of frames of data, N, transmitted during each period of T sec, the period T being the interleave depth, according to the relationship:

$$R = N \times F/T,$$

where R bps is the physical layer data rate, F bits is the physical layer frame size, and T sec is the frame period.

6. The method of claim 5 wherein the data rate is varied between F/T bps and N×F/T bps using the same set of frame sizes by varying the number of frames of data, N.

7. The method of claim 1 further comprising the step of transmitting the major frame structure selected in the second step serially.

8. The method of claim 1 further comprising the steps of:

inserting said minor frames of user data into said data fields of said minor frame structures; and transmitting said minor frame structures in parallel.

9. The method of claim 8 wherein said minor frame structures are transmitted in parallel using a different Walsh code for spreading each of said minor frame structures.

10. A method of creating a frame structure for a specific data rate in a variable rate CDMA communication system having data rates which are multiples of a basic data rate and having full rate frames and fractional rate frames with predetermined full and fractional rate frame formats, each with a predetermined size, comprising the steps of:

dividing the specific data rate by the basic data rate to produce a ratio having at least one of an integer portion and a fractional portion;

concatenating a plurality of full rate frames equal in number to the integer portion of said ratio to form a concatenation of full rate frames;

concatenating to said concatenation of full rate frames a single fractional rate frame equal to the fractional portion of said ratio;

whereby the frame structure contains the greatest number of full rate frames.

11. The method of claim 10 wherein the specific data rate is determined by selecting the number of frames, N, transmitted during each period of T sec, the period T being the interleave depth, according to the relationship:

$$R = N \times F/T,$$

where R bps is the data rate, F bits is the frame size, and T sec is the frame period.

12. The method of claim 10 wherein the specific data rate is varied between F/T bps and N×F/T bps using the same set of frame structures by varying the number of frames N.

13. The method of claim 10 wherein the variable rate communication system operates in accordance with the IS-95 communications standard.

14. Apparatus for formatting user data into major frames of data for transmission at a plurality of physical layer data rates in a variable rate CDMA data network capable of transmitting frames of data, comprising:

means for determining one of said physical layer data rates;

means for selecting a major frame structure, that correlates with said one of said physical layer data rates, from among a number of predetermined major frame structures comprising a predetermined group of minor frame structures, each of said minor frame structures having a data field of predetermined size for inserting user data;

means for partitioning user data into minor frames of user data; and means for inserting said minor frames of user data into said data fields of said minor frame structures in the major frame structure selected by said means for selecting a major frame structure.

15. Apparatus for creating a frame structure for a specific data rate in a variable rate CDMA communication system having data rates which are multiples of a basic data rate and having full rate frames and fractional rate frames with predetermined full and fractional rate frame formats, each with a predetermined size, comprising:

means for dividing the specific data rate by the basic data rate to produce a ratio having at least one of an integer portion and a fractional portion;

means for concatenating a plurality of full rate frames equal in number to the integer portion of said ratio to form a concatenation of full rate frames; and means for concatenating to a concatenation of a plurality of full rate frames a single fractional rate frame equal to the fractional portion of said ratio;

whereby the frame structure contains the greatest number of full rate frames.

* * * * *